United States Patent [19]

Auclair et al.

[11] Patent Number: 5,237,318
[45] Date of Patent: Aug. 17, 1993

[54] DYNAMIC SWITCHING ARRANGEMENT FOR ERROR MASKING IN A SYSTEM FOR DOUBLING THE DIGITAL CHANNEL

[75] Inventors: Jean-Yves Auclair, Trappes; Jean-Marc Bonnet, Paris, both of France

[73] Assignee: U.S. Philips Corporation, New York, N.Y.

[21] Appl. No.: 693,975

[22] Filed: Apr. 29, 1991

[30] Foreign Application Priority Data

Apr. 27, 1990 [FR] France .................. 90 05412

[51] Int. Cl.[5] .................. H04B 1/00
[52] U.S. Cl. .................. 340/825.01; 375/40; 375/100
[58] Field of Search .............. 340/825.01, 825.03, 340/826, 827; 371/68.1; 375/38-57, 102, 100

[56] References Cited

U.S. PATENT DOCUMENTS

| | | | |
|---|---|---|---|
| 4,380,814 | 4/1983 | Shinmyo | 375/40 |
| 4,799,237 | 1/1989 | Itoh | 375/40 |
| 4,827,490 | 5/1989 | Guerin | 375/11 |
| 4,926,498 | 5/1990 | Suzuki et al. | 375/100 |
| 5,065,411 | 11/1991 | Muto | 375/100 |

FOREIGN PATENT DOCUMENTS 3206749 9/1983 Fed. Rep. of Germany .
3800977 7/1989 Fed. Rep. of Germany .

Primary Examiner—Donald J. Yusko
Assistant Examiner—Dervis Magistre
Attorney, Agent, or Firm—Leroy Eason

[57] ABSTRACT

Input frames TAR, TARB of each of two diversity digital channels, shifted randomly in time, are applied to respective variable delay memories, which in turn provide in-phase frames on the selection terminals of an output switch. An error masking circuit, including an error detector having various levels of error gravity, and a priority encoder for comparing errors between the two channels and an R-S flip-flop, is connected between each input terminal and a switch control terminal. The better quality frame of the two digital channels is selected and provided as the output signal of the dynamic switching circuitry.

4 Claims, 3 Drawing Sheets

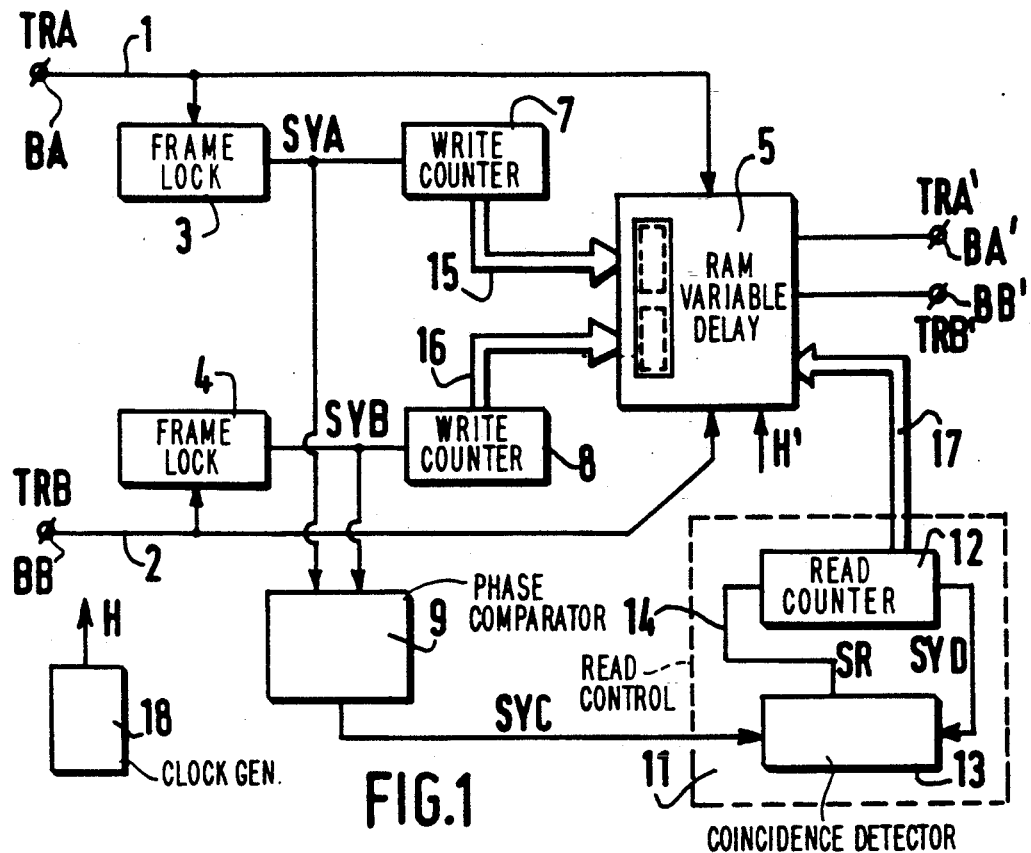
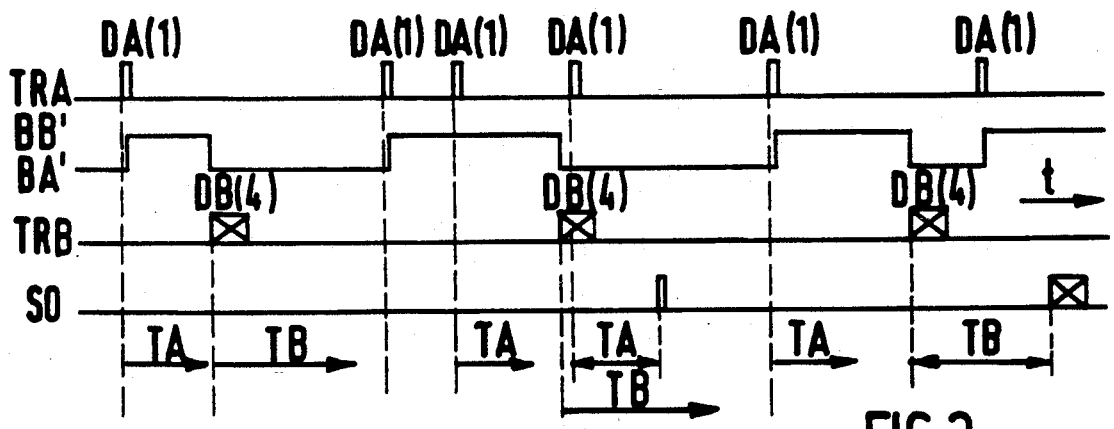
FIG.3
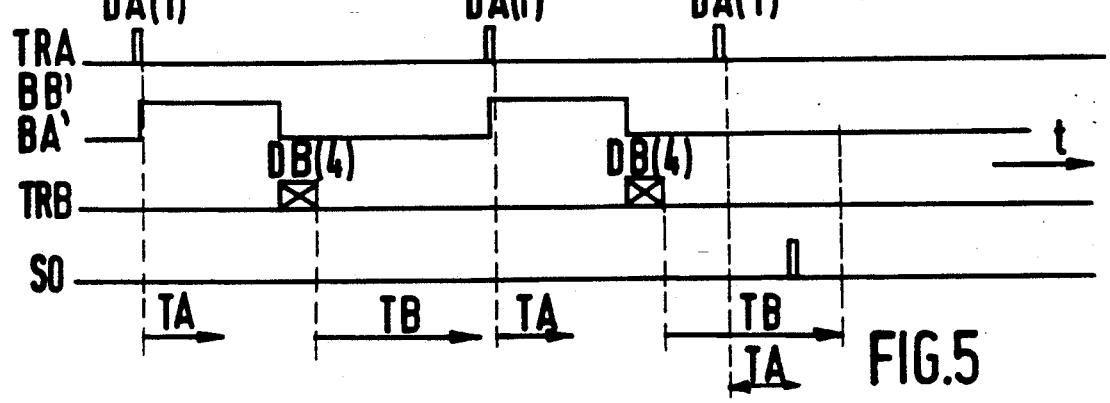
FIG.5

DYNAMIC SWITCHING ARRANGEMENT FOR ERROR MASKING IN A SYSTEM FOR DOUBLING THE DIGITAL CHANNEL

FIELD OF THE INVENTION

The invention relates to a dynamic switching arrangement for switching signals over two digital channels each carrying a frame TRA or TRB, these frames conveying the same information, but being affected by different delays, to respective input terminals BA, BB in a digital information block transmission system, comprising for each channel a variable delay memory between said input terminal BA (or BB) and an intermediate terminal BA', BB' respectively, constituted by a selection terminal of a switch, and control means of said variable delay memories for bringing the two signals on said intermediate terminals in phase again.

Any digital transmission system may be disturbed by a large number of causes, such as the imperfection of the transmission medium (for example, radio relay link), the presence of noise on the transmission channel, radio interference or a breakdown. These disturbances are manifested on the side of the user by an error rate in the bit stream used and by periods of time during which transmission is interrupted. When the cost of the bit stream is not too high, more specifically in ground-based communication networks, a simple prior-art solution for eliminating this drawback consists of duplicating the signal to be transmitted, transmitting the signal over two separate channels and selecting the better of the two signals on reception. The present invention in this context is related to the doubling of the digital channel.

BACKGROUND OF THE INVENTION

Simple systems based on this principle exist in telecommunication networks; they make it possible to considerably reduce the risk of cutting off a connection in case of failure of one of the two channels and are similar to the automatic stand-by systems in the redundant transmission means, but do not generally reduce the error rate of the selected connection. In simple stand-by systems the switching from one digital channel signal to another is effected without any precautions and generally causes an error packet as a result of the loss of a clock, a frame and so on. This is caused by the fact that the two received signals have been transported separately via transmission means and arrive at instants shifted in time.

Consequently, a first technical problem to be solved before the dynamic switching of the signal can be effected correctly consists of bringing the two received signals in phase again. In these conditions it becomes possible to change from a signal of frame TRA to a signal of frame TRB as often as necessary, in response to the respective errors in each frame, without the risk of degrading transmission and to employ the maximum errorless period of time of each digital channel. The problem of correcting the phase of the signals can be solved in a prior-art manner by establishing a feedback loop between the output and the control input of a variable delay circuit inserted in a first information channel, while a control circuit which furthermore receives the same information present on a second channel and shifted in time, is inserted in the loop.

The second technical problem linked with the first problem mentioned above is error detection in the two digital channels and the control of the switch in response to these errors. This error detection is performed in prior-art manner after the signals have been brought into phase again as described, for example, in Patent Application DE-A 38 00 977. However, this document discloses a simple case where there is no discrimination between error levels as regards the gravity of the error and where the probability with which errors simultaneously appear in the bits in the two transmission channels is neglected, which considerably simplifies the switch control.

SUMMARY OF THE INVENTION

It is an object of the invention to solve the two aforesaid technical problems in a different manner and with greater discrimination of the errors on the two digital channels, while two simultaneous errors which furthermore may have different levels of gravity are considered. According to the invention the solution to the second technical problem is not subordinate to the previous solution to the first problem with prior-art means as indicated hereinbefore, in that the error comparison is effected before the synchronization, which is advantageous in that, compared to the prior art, the same delay element can be used for phase correction of the signals and for the introducing the delay which is necessary because of the error masking after the switching from one digital channel to another. This object is achieved and the prior-art disadvantages are eliminated because the switching arrangement described in the opening paragraph furthermore comprises:

masking means for error masking between the input terminals BA, BB and a control terminal of the switch, comprising at least the following elements:
an error detector having various levels of gravity for each channel,
a priority encoder which permanently compares the errors of the two channels while considering their level of gravity
a R-S flip-flop controlled by the priority encoder and which controls said switch so that the output signal SO of the arrangement at the common terminal of said switch carries the frame having the better quality of the two digital channels.

The main original feature of the arrangement according to the invention resides in the fact that the error detection in the frames TRA and TRB is effected before respective information blocks are brought into phase again. It should be observed that despite this particularity of the arrangement, the switching to one or the other selection terminal of the switch for frame carriers TRA', TRB' realises the desired error masking, more particularly, the masking of non-simultaneous errors over the two frames, this hypothesis already being more restrictive than for the above prior art. In contradistinction thereto, in the case of errors shifted by a time interval which is shorter than the delay period $\Delta t$ of one frame signal relative to the other at the input of the arrangement, there is the additional problem of having to delay the switching by a period of time at least equal to the value $\Delta t$, which corresponds to the phase shift as will be explained hereinbelow in the detailed description.

In order to solven this additional problem, a preferred embodiment of the invention is characterized in that said error masking means further comprises for each of said digital channels, an error memory inserted between said error detector and said priority encoder and controlled by a delay means which indicates the end of the error so as to maintain the error indication on the priority encoder during the complete transit time of the error in said delay memory.

Preferably, the error-end delay means included in the latter embodiment is constituted by:
an error-end detector connected to the output of the error detector whose outputs increment,
a data counter whose output signal EDATE is at once supplied to:
  a separate date memory, and
  a data memory associated to said variable delay memory,
and a comparator, which compares for each information block the output signals of the separate date memory and the output signal SDATE of the associated date memory and which supplies separate control signals to said error memory.

It will thus be possible to obtain a correct switching operation of the switch when a single variable delay memory for each frame TRA, TRB is used. Preferably, as will be described hereinbelow, the two variable delay memories are constituted themselves in the form of a common double memory having cyclic addressing, of which each location contains a block of the frame TRA and a block of the frame TRB which have the same rank within the blocks, this addressing being effected in the write mode by two separate write counters, locked each on to each synchronizing (sync) signal and, in the read mode, by a read counter for each location which forms part of a control element controlled by a phase comparator.

BRIEF DESCRIPTION OF THE DRAWINGS

The following description with reference to the annexed drawings, given by way of example, will make it better understood how the invention may be realised, in which:

FIG. 1 is a block diagram of a signal phasing arrangement;

FIG. 3 is a time diagram which makes it possible to explain the operation of the dynamic switching arrangement shown in FIG. 2;

FIG. 5 is a time diagram used for explaining the operation of the arrangement shown in FIG. 2.

DESCRIPTION OF PREFERRED EMBODIMENTS

Figure 2:
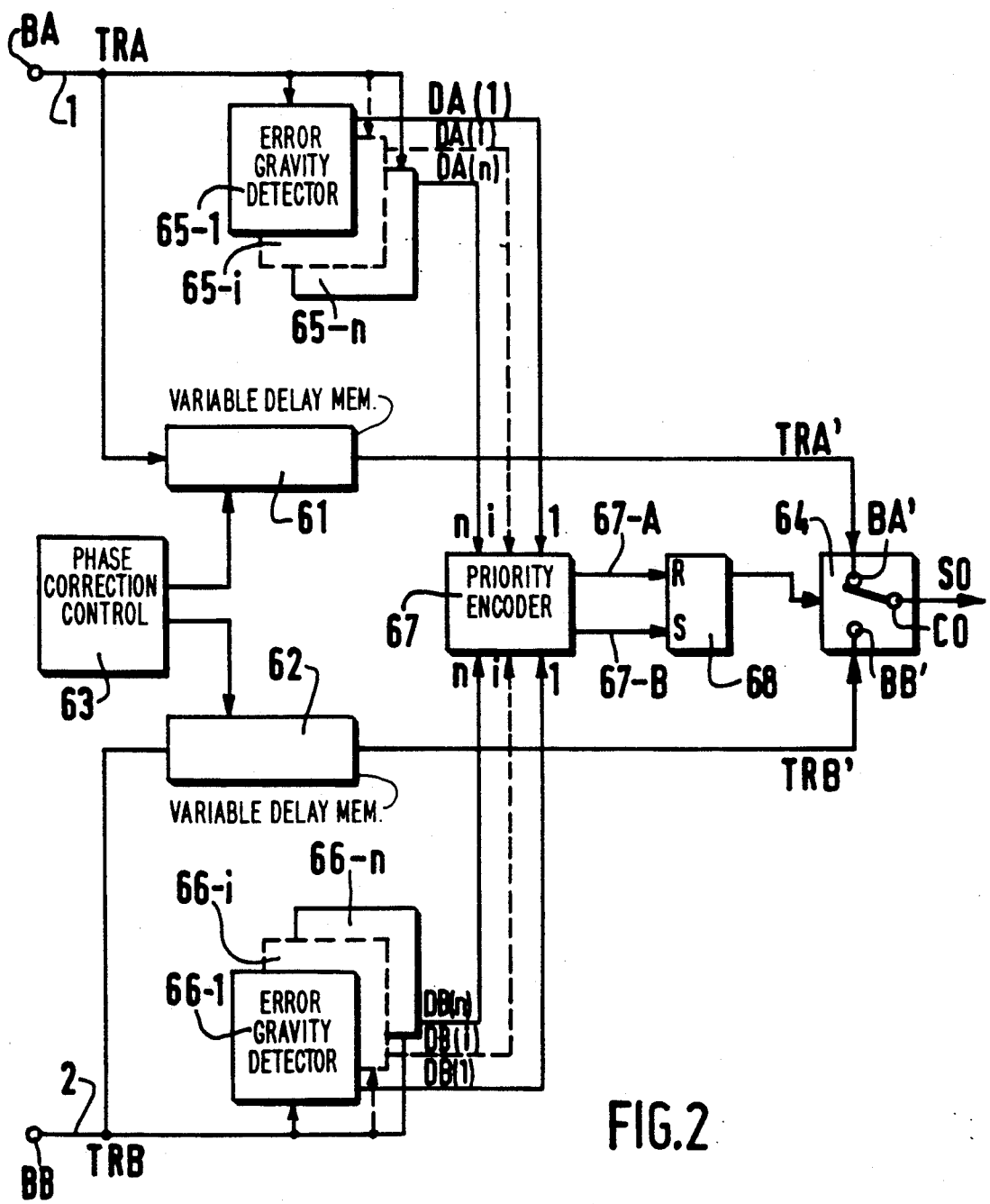
FIG. 2 is the overall block diagram of the dynamic switching arrangement according to the invention.

In FIG. 1 two digital channels 1 and 2 are represented which carry at the input terminals BA, BB respectively, the signals of frames TRA and TRB which carry the same information but are affected by different delays. For example, let us assume a 2048 kbit/s time-division telephone transmission system, in which each frame comprises 32 telephone channels, at a rate of one sample encoded over 8 bits for each channel, which means, frames of 256 bits. The maximum envisaged phase shift between the signals TRA and TRB is large and may become several hundred frames. In the digital example under discussion this maximum phase shift is, for example, equal to 256 frames, which is 65536 bits.

In prior-art manner the frame signal comprises, at regular time intervals, free bits which may particularly be used for transporting complementary information bits. One of these bits is used for creating a low-frequency superframe signal whose period T is at least equal to double the maximum phase shift expressed in bit time (TBI). In aforesaid frame of 2048 kbit/s, the frequency of the superframe signal is, for example, equal to 15 Hz.

Each signal TRA, TRB is fed to a frame locking means 3, 4 and also to a common variable delay means 5 constituted by a double memory. Preferably, memory 5 is a circular memory of the double access static RAM type.

Each frame locking means 3, 4 of conventional design is devised for detecting in the frame signal the pattern of the low-frequency superframe in order to lock on to this pattern and produce a frame sync signal SYA, SYB in the form of a square-wave signal having period T. Each signal SYA, SYB is applied to a counter 7, 8 and these two signals are also applied to a phase comparator 9. For completeness of the diagram the phase comparator 9 applies a pulse signal SYC having period T to a control element 11 which is constituted by a read counter 12 and a coincidence detector 13, the latter receiving the signal SYC and a sync signal SYD having period T from the counter 12 and, if there is no phase coincidence of these two signals, producing a reload signal SR on the conductor 14 which leads to the counter 12. The counters 7, 8 and 12 respectively, which are cyclic counters are used for addressing in the write mode, or read mode respectively, memory 5 over the address bus 15, 16 in the write mode and a bus 17 in the read mode. A clock generator 18 produces a clock signal H at the data bit rate (TBI) to all the circuits of FIG. 1 (the connection to these circuits having intentionally been omitted in the drawing for clarity). In memory 5 the clock signal H or, preferably, a derived signal H' is used for writing and reading the data blocks at the frequency 1/TBL of the bytes or the frames that constitute the data blocks. Each write counter 7, 8 is locked on to the sync signal SYA, SYB, while its MSB (for example, the weight 16) is activated at the frequency 1/T and its LSB at the frequency of the data bits (signal H). For the addressing in the write and read modes one may use all the significant bits of the counters defined hereinbefore, in which case the capacity of memory 5 is equal to the number of data bits contained in a period T of the superframe signal. Advantageously, the MSB is not used for addressing, which allows to reduce the capacity of memory 5 to half the capacity indicated in the preceding sentence. Each location 19 of the memory is double and contains, just prior to being read, a block of TRA and a block of TRB, which blocks have the same rank in the period defined by superframe signals which are equal to each other in TRA and TRB, these two blocks being thus carriers of the same information apart from the transmission errors. The result of the reading of each memory location is that at two output terminals BA', BB' frame signals TRA', TRB' are substantially synchronous. At a given instant $t_0$ controlled by the signal H', the address buses 15 and 16 point at locations for which the difference in rank indicates the time shift $\Delta t$ to be compensated for between the frames TRA and TRB. At this instant $t_0$ the address bus 17 points at a location whose rank itself is shifted relative to the recording of the most delayed data signal by a predetermined number of blocks M×TBL, where M is an integer chosen to be the lowest possible for the envisaged application. This operation to control the read counter 12 relative to the write counters 7 and 8 is performed by means of the phase comparator 9 and the coincidence detector 13. The phase comparator performs two functions, the first of which consisting of determining which of the two sync signals of frames SYA and SYB it receives is delayed the most. For this purpose it comprises a finite state machine (not shown) which produces a logic value "1", "0" or "0", "1" respectively, depending on whether SYA lags SYB or whether SYB lags SYA. The second function is a selection function which may simply be performed by means of a two-way switch (not shown), controlled by the output signal of the finite state machine. The selection terminals of the switch receive each a signal derived from signal SYA or SYB respectively, in the form of a pulse signal having the same period (T) as a result of the brief monostable action on the ascending edge or, preferably, on the descending edge of the square-wave signal it receives (SYA or SYB). The switch thus produces a pulse signal SYC which is the transformed signal SYA or the transformed signal SYB (more delayed) in accordance with the logic output value of the finite state machine.

In the read control element 11 the coincidence detector 13 receives the signal SYC, and the signal SYD coming from the read counter 12. The signal SYD which is synchronized with the counting cycle of the read counter which signal has a predetermined delay of about M×TBL, has a low cyclic ratio, much less than 0.5 and is presented in the form of a pulse signal having the same period (T) as SYC but whose pulse duration is much longer than that of SYC. When the pulse of SYC is produced during the pulse of SYD, the phasing arrangement operates in a nominal fashion as has already been described above. The difference of pulse width is controlled in a manner so as to absorb maximum jitter (of the order of several dozen bits) which may occur between the clock signal H and the different signals present in the arrangement, more particularly between the signals SYC and SYD. If, on the other hand, the pulses SYC and SYD do not coincide in time as is the case, for example, when power is no longer applied to the arrangement, a reload signal SR in the form of a logic "1" or "0" is transmitted to the RESET input of the counter 12, which causes the pulse of SYD to be shifted to that of SYC and, simultaneously, to reset the read addresses to their nominal value, there being provided that the counter 12 is devised, by its structure, for producing the optimum shift between the read and write addresses when the signals SYC and SYD are, in essence, in phase. The concept and the operation of the circuits 12 and 13 and of memory 5 for performing the simple functions described above are within grasp of those skilled in the art.

By means of a simple relative preadjustment between the read cycle and the transmission of the signal SYD it is then possible to adjust the value of M from a minimum value just necessary for restoring the situation of phase alignment of the signals TRA, TRB in the form of sync signals TRA', TRB', to a value which adds an additional fixed delay TF of the signals TRA', TRB' to the signals TRA, TRB, without changing anything in the structure or operation of the arrangement shown in FIG. 1.

For the error masking by means of dynamic switching it is always necessary to introduce the afore-mentioned fixed delay TF. This fixed delay is thus at least equal to the transmission duration of a data block, because this block is to be completely received before its validity can be decided on, this duration being augmented by time interval TC necessary for the detection of the error in the erroneous block and the control being effected by the switch, that is to say:

$$TF > TBL + TC$$

In practice, since the time interval TC is near to TBL, the minimum value of:

$$TF_{min} = 2TBL$$

is chosen as a value for the fixed delay TF.

In FIG. 2 are represented the input terminals BA and BB which carry the same digital information frame signals TRA and TRB as shown in FIG. 1. The phasing arrangement is symbolized by two variable delay memories 61, 62, controlled by phase correction control means 63. This phase correction may be effected by any prior art means, for example, by locking on to the phase of the memories 61 and 62 so as to obtain the in-phase signals TRA' and TRB' at the terminals BA' and BB', which are in this case the selection terminals of the switch 64 whose shared terminal CO is the origin of the output signal (SO) of the dynamic switching arrangement according to the invention. Preferably, the phasing arrangement is the one described hereinbefore with reference to FIG. 1. Each frame signal is supplied from its input terminal to a multiple error level detector having several levels of error gravity 65-1, ..., 65-$i$, ..., 65-$n$ (66-1, ..., 66-$i$, ..., 66-$n$ respectively). Each elementary error detector is of a prior-art type which receives the signal TRA (TRB respectively) detects within each frame block a given type of error (fault) of a given level of gravity, and produces a logic error signal, for example "1" if an error occurs in the analyzed block and "0" in the opposite case. These logic signals are referenced DA(1), ..., DA($i$), ..., DA($n$), (DB(1), ..., DB($i$), ..., DB($n$) respectively), which indices rise from the lowest level of gravity to the highest level of gravity. The gravity level 1 is that of an error corresponding to an error rate and detected by means of a code CRC, for example, the code CRC4. At a much higher gravity level, the level $i$, an error is detected in a frame locking word. The highest gravity level $n$ is that of the absence of a signal, in which case the error signal of the order $n$ at the output of the detector is maintained during the entire period of signal absence. The error signals DA($i$) and (DB($i$) respectively, are applied to a priority encoder 67. This priority encoder, which has a simple structure to those skilled in the art, acts as a partial comparator by means of a comparison of similar input error signals, from a gravity level which is the highest to the lowest gravity level, while this comparison is terminated when the opposite logic values appear for one of the gravity levels. In other words, the comparison commences at the level $n$ and is carried through from a gravity level $i$ to the level just below, $i$-1, whereas the logic signals compared in pairs are detected as having the same logic value "0" and "0" (without errors on either of the two blocks at the level under consideration) or "1" and "1" (an error in each one of the two blocks at the level under consideration). The priority encoder 67 has two outputs 67-A and 67-B connected to the respective inputs R and S of a R-S flip-flop 68 whose Q output controls the switch 64. The logic values appearing at the outputs 67-A and 67-B are, for example, the inverse values of those of the first pair of opposite values detected at the input during the comparison which is permanently sequentially made with the frequency at which the data blocks appear. For convenience it is supposed that the appearance of a "1" at the R input ("0" at S) causes the switch to be switched to or maintained at the terminal BA', as represented in FIG. 2, and that the appearance of a "1" at the S input ("0" at R) causes the switch to be forced to terminal BB'. Under these conditions, the truth table of the priority encoder 67 is the following for two neighbouring gravity levels, i and i−1:

TABLE

| GRAVITY LEVEL | | | | SWITCHING | | |
|---|---|---|---|---|---|---|
| DA(i) | DA(i − 1) | DB(i) | DB(i − 1) | R input | S input | switching |
| 0 | 0 | 0 | 0 | 0 | 0 | Q(i − 2) |
| 0 | 1 | 0 | 0 | 0 | 1 | BB' |
| 0 | 0 | 0 | 1 | 1 | 0 | BA' |
| 0 | 1 | 0 | 1 | 0 | 0 | Qo |
| 1 | X | 0 | X | 0 | 1 | BB' |
| 1 | X | 1 | X | 0 | 0 | Qo |
| 0 | X | 1 | X | 1 | 0 | BA' |

In the truth table, the sign X denotes equally the logic values "1" or "0" and Qo denotes the preceding state of the switch and implies that the comparison need not be continued to the lower stage. It should be observed that this truth table does not take into consideration, in dynamic operation, all the possible logic states of the elements 67, 68 and 64 taken together, all this, however, being sufficient to explain the operation of this sub-assembly and to make it possible for those skilled in the art to realise it. More particularly, the indication BB' or BA' in the column called Switching implies a moving of the switch to this terminal only if the latter was set to the other terminal (BA', BB') during the comparison of the preceding block. For that matter, the indication Q(i−2) implies that the comparison is to be carried out at the stage i−2.

In the arrangement as shown in FIG. 2 the assembly constituted by the multi-gravity level error-detectors, the priority encoder and the R-S flip-flop form a multi-gravity level error masking means. This makes it possible to obtain a frame signal at the output SO which has a better quality than the signal TRA or TRB, as will be explained hereinbelow with reference to FIG. 3. In this FIG. the signals TRA, TRB, SO and the position of the switch 64 (terminal BA' or terminal BB') have been represented. Given the selected time scale, the width of a block is very small and the switching delay of one of the frames TRA and TRB which is less than 2×TBL may be considered negligibly small. In contradistinction thereto, the delay of the least delayed frame signal (delay TA of the signal TRA in this case) which is equal to the fixed delay TF in the memories 5, 61 or 62, has been fixed at a sufficiently high value of the order of several dozen times the duration TBL to make the Figure more distinct. The delay TA represents the transit time of the signal TRA in the memory 61 (or 5), the delay TB is the transit time in the memory 62 (or 5) and the time Δt which represents the phase shift between TRA and TRB is equal to TB-TA. For simplification of the Figure it is supposed that always the same type of error occurs in the signal TRA or the signal TRB; this is not harmful to the generality of the exposition as the perfect symmetry between the structure and the operation of the arrangement is given. With respect to the signal TRA it is a matter of, for example, a diffuse error rate, detected by a code CRC, known by the term of: erroneous blocks CRC4 or errors of the type DA(1). For the signal TRB, the errors are more serious, less frequent, whereas the transmission is disturbed by frame locking losses. This second type of error is denoted, for example, DB(4). It is established that in most cases the errors on one or the other digital channel are masked, in the signal SO, due to that which has been described hereinbefore. In case an error simultaneously occurs on the two channels, as is represented in the centre of FIG. 3, the more serious error is masked. However, an undesirable situation does exist, represented to the right of the Figure, in which out of the two errors that do not occur simultaneously but are rather close together in time, the most serious error is transmitted. This is due to the fact that the type DA(1) error causes a switching to the terminal BB' just prior to the type DB(4) error leaves the memory 62 (or 5) and, more generally, this is caused by the fact that there is the transit time TB. A second embodiment of the dynamic switching arrangement represented in FIG. 2 and which constitutes a perfectioning of the latter because it eliminates the aforesaid undesirable case, will be described hereinbelow with reference to the FIGS. 4 and 5.

Figure 4:
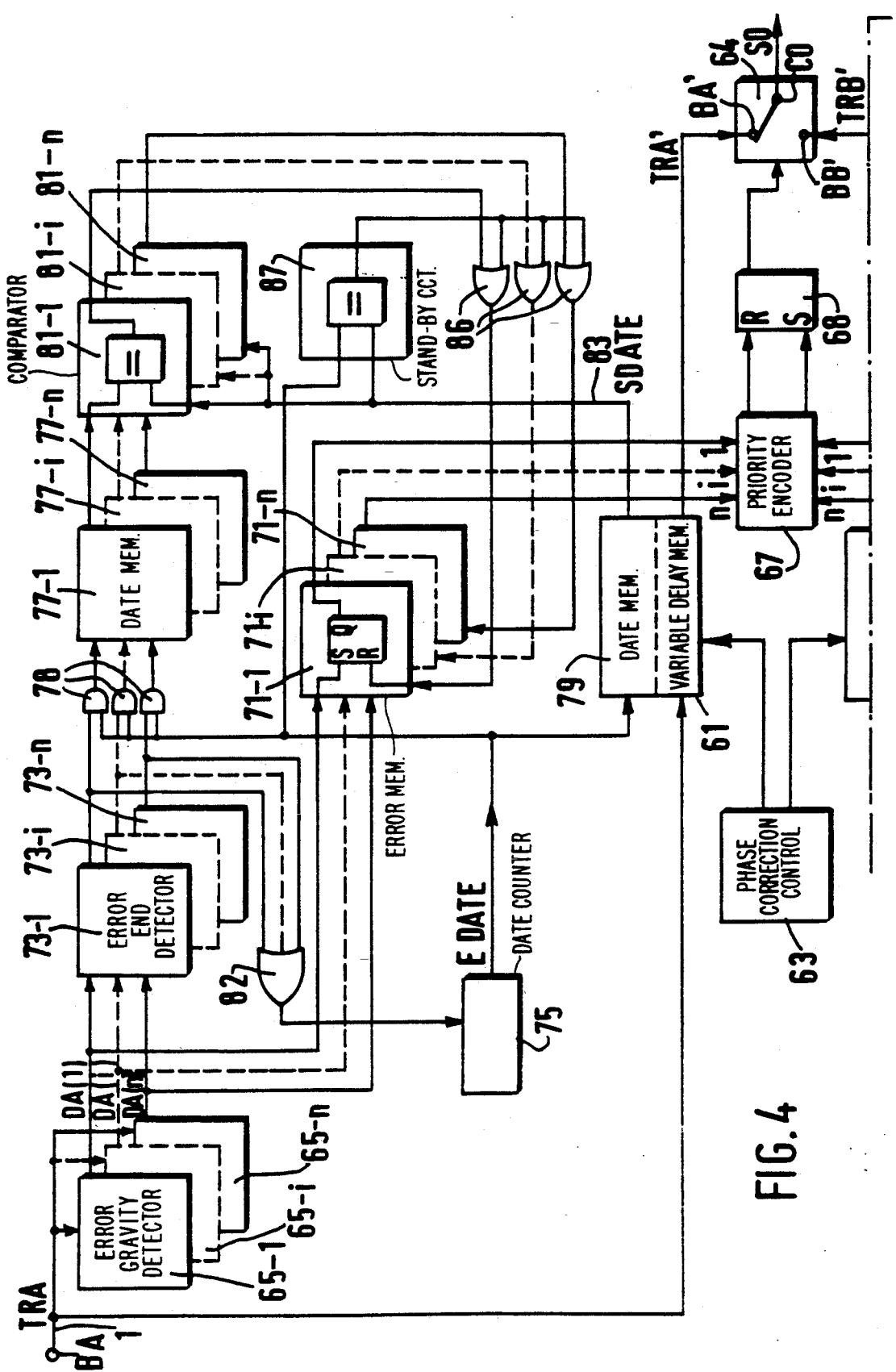
FIG. 4 shows the detailed block diagram of a preferred embodiment of the dynamic switching arrangement according to the invention.

In FIG. 4 most elements shown in FIG. 2 have been referenced by the same reference characters. The arrangement shown in FIG. 4 causes an error end delay. For this purpose, the error masking means furthermore comprises an error memory associated to each error detector. FIG. 4 represents of the common processing section for the signals TRA and TRB only the processing section for signal TRA, while the section relative to signal TRB which is completely symmetrical with that for signal TRA as regards structure and operation, is not represented. The error memory for the signal TRA is constituted by R-S flip-flops 71-1, . . . , 71-i, . . . , 71-n which receive each on their S (SET) inputs the respective output signals DA(1), . . . , DA(i), . . . , DA(n) of the error gravity detectors 65-1, . . . , 65-i, . . . , 65-n and whose outputs (Q outputs of the R-S flip-flops) are connected to the inputs of the same rank of the priority encoder 67. The error memory receives a control signal at each R (RESET) input of the R-S flip-flop coming from the error end delay means. This delay means is in essence constituted by:

an error end detector 73-1, . . . , 73-i, . . . , 73-n which receives the logic error signals DA(1), . . . , DA(i), . . . , DA(n)
a date counter 75
a separate date memory 77-1, . . . , 77-i, . . . , 77-n, whose inputs are connected each via logic AND gates 78 to the inputs of the separate date memory, an associated date memory 79, coupled to the variable delay memory 61 (5) respectively) and
a comparator 81-1, . . . , 81-i, . . . , 81-n, which receives on first inputs the output signals of the separate date memory 77. The arrangement sequentially operates at the transmission rate of the data blocks 1/TBL.

Via an OR gate 82, the output signals of the error end detector increment the date counter 75 by unity at the instant TE which marks the end of an error DA(j), whatever its gravity level j such instant may appear at any time in block TBL after the error under consideration occurs. The state of the counter 75 after incrementation, referenced EDATE at the output thereof, thereby takes each error-end instant TE into consideration.

The signal EDATE is permanently applied to the separate date memory 77 via one of the logic gates 78. Each date of an error end is thus memorized by storing at each instant TE the state of the counter in the section j of the separate date memory associated to error DA(j) under consideration. Simultaneously, the same count (the same date) is stored in the associated date memory (79), in the same memory location as that of the information block coinciding with the end of error DA(j) and in the next locations. During the entire transit interval TA in the memory 79, the indication of the error DA(j) is maintained at the input j of the priority encoder, that is to say, as long as the R-S flip-flop 71-j of the error memory is not reset. With each reading of the block which produces the frame TRA' at the terminal BA', the date SDATE associated to this block is simultaneously read and applied over a conductor 83 to a second input of the comparators 81-l, ..., 81-i, ..., 81-n. In case numbers at the input of each of the comparators turn out to be equal, the comparator 81-j, for example, a logic reset-to-zero signal is produced via an OR gate circuit 86 to the RESET input of the R-S flip-flop 71-j of the error memory. This acting on the flip-flop 71-j causes the state at the input of the priority encoder to pass from "1" to "0" and thus marks the end of the delay of the end of the error DA(j).

With the arrangement shown in FIG. 4 each input of the priority encoder is active once an error has been detected, during the entire period of the error augmented by the transit time of the data in the variable delay memory of the frame signal under consideration. The operation will be obtained to be described hereinafter with reference to FIG. 5 where the same type of representation as that of FIG. 3 is adopted.

For the three first errors represented to the left of the Figure, the moving of the switch from one selection terminal to the next is effected as shown in FIG. 3. Errors DA(1), DB(4), DA(1) are concerned which are sufficiently wide apart for not having an interference between the two frame signals TRA and TRB as regards their influence on switch 64. However, it should be observed that in FIG. 5 the intervals TA and TB are calculated on the basis of the end of the errors and not their beginning. The case of simultaneous errors which is not represented, is also shown according to FIG. 3. In contradistinction thereto, the undesirable case to the right of FIG. 3 no longer occurs as is shown to the right of FIG. 5: the error DB(4) which causes the very rapid movement of the switch from DB' to BA' or after a period of time situated between 1 and 2 block periods, also causes the switch to remain at BA' during the interval TB until the last error block DB(4) appears at terminal BB'. During this period of time TB the error DA(1) in the signal TRA is transmitted after the interval TA in the output signal SO. From the end of the interval TB and in the absence of an error in the signal TRA, the switch remains connected to terminal BA'. One thus obtains that it is always the gravest errors that are masked in case of conflict over the action of the switch provoked by the different levels of gravity of the errors which appear in the frame signals TRA and TRB.

In order to obtain a proper operation of the circuit of FIG. 4, two additional arrangements may be considered.

In the first place an automatic restarting of the arrangement is preferably realised by means of a stand-by circuit 87, constituted by a comparator which is identical with the comparator 81-i, which receives and compares the EDATE signals and the SDATE signals and produces, when there is equality, a reset control signal to the error memory R-S flip-flops 71-1, ..., 71-i, ..., 71-n, via the OR gates 86. When power is applied to the arrangement, it is made possible by the circuit 87 to reset the error memory to zero during an operating cycle in which the date counter is not incremented, which resetting is necessary for starting the arrangement.

Another arrangement is to adapt the capacity of each cyclic date counter such as 75 to the maximum number of errors which will probably occur during the period of time TA (or TB). This capacity is to be sufficiently large so that two identical dates cannot coexist in one or the other associated date memory, because this would entail an ambiguity during the comparison in 81-1, ..., 81-i, ..., 81-n, given the fact that two distinct errors cannot end simultaneously in the same frame.

The realisation of the circuits described hereinbefore is within grasp of those skilled in the art, these circuits being either prior art or of a simple concept. The arrangement according to the invention is preferably realised in the form of integrated circuits. More specifically, for the embodiment which unifies the data memories (memory 5 of FIG. 1) the most, an integrated circuit is devised for realising memory 5 and two associated date memories and an integrated circuit for realising the other elements of the arrangement, which relates to the embodiment of FIG. 2 or to that of FIG. 4.

We claim:

1. A dynamic switching circuit arrangement for use in a digital information transmission system, having respective channel input terminals BA and BB for reception of respective channel diversity signals, the channel signals conveying the same information but at different time delays and respectively carrying frames TRA and TRB;

comprising for each channel a variable delay memory between the channel input terminal and an intermediate terminal BA', BB' respectively, said intermediate terminals being selection terminals of a switch having an output at which an output signal SO is produced, and control means for said variable delay memories for bringing the signals at said intermediate terminals into phase again; and characterized in that said circuit arrangement further comprises error masking means for controlling said switch so that errors in the received channel signals at the input terminals BA, BB are masked in said output signal SO produced at the output of said switch, said error masking means comprising:

a multi-gravity level error detector for each channel for detecting various levels of gravity of error of the channel signal;

a priority encoder coupled to both of said error detectors for continuously comparing the error gravity levels of both channel signals and producing control signals dependent on such comparisons; and an R-S flip-flop controlled by the control signals produced by the priority encoder to produce an output which controls said switch so that the output signal SO at the output of said switch carries frames which are selected as between the respective channel signals to obtain those which are of better quality.

2. A circuit arrangement as claimed in claim 1, characterized in that said error masking means further comprises, for each of said channels, an error memory coupled between said error detector and said priority encoder and controlled by a delay means which indicates the end of an error in the channel signal; whereby the gravity level of a channel signal error, as determined by the priority encoder, is maintained during the complete transit time of such error through said delay means.

3. A circuit arrangement as claimed in claim 2, characterized in that said delay means comprises:

an error-end detector connected to the output of said error detector and having outputs which increment a date counter each time an error in a channel signal ends, the output EDATE of said date counter being supplied to a first date memory and also to a second date memory which is associated with said variable delay memory; and a comparator which compares, for each of successive information blocks of the channel signal, the output signal of said first data memory with the output signal SDATE of the second data memory and supplies separate control signals in accordance with such comparisons to said error memory.

4. A circuit arrangement as claimed in claim 3, characterized in that said delay means further includes a stand-by circuit which receives the signal EDATE and the signal SDATE and supplies a common control signal to said error memory.

* * * * *